3,546,111
WASTE TREATMENT
Arthur W. Busch, Houston, Tex., assignor to Ethyl Corporation, New York, N.Y., a corporation of Virginia
Filed May 13, 1968, Ser. No. 739,603
Int. Cl. C02c 1/04, 5/02
U.S. Cl. 210—10       5 Claims

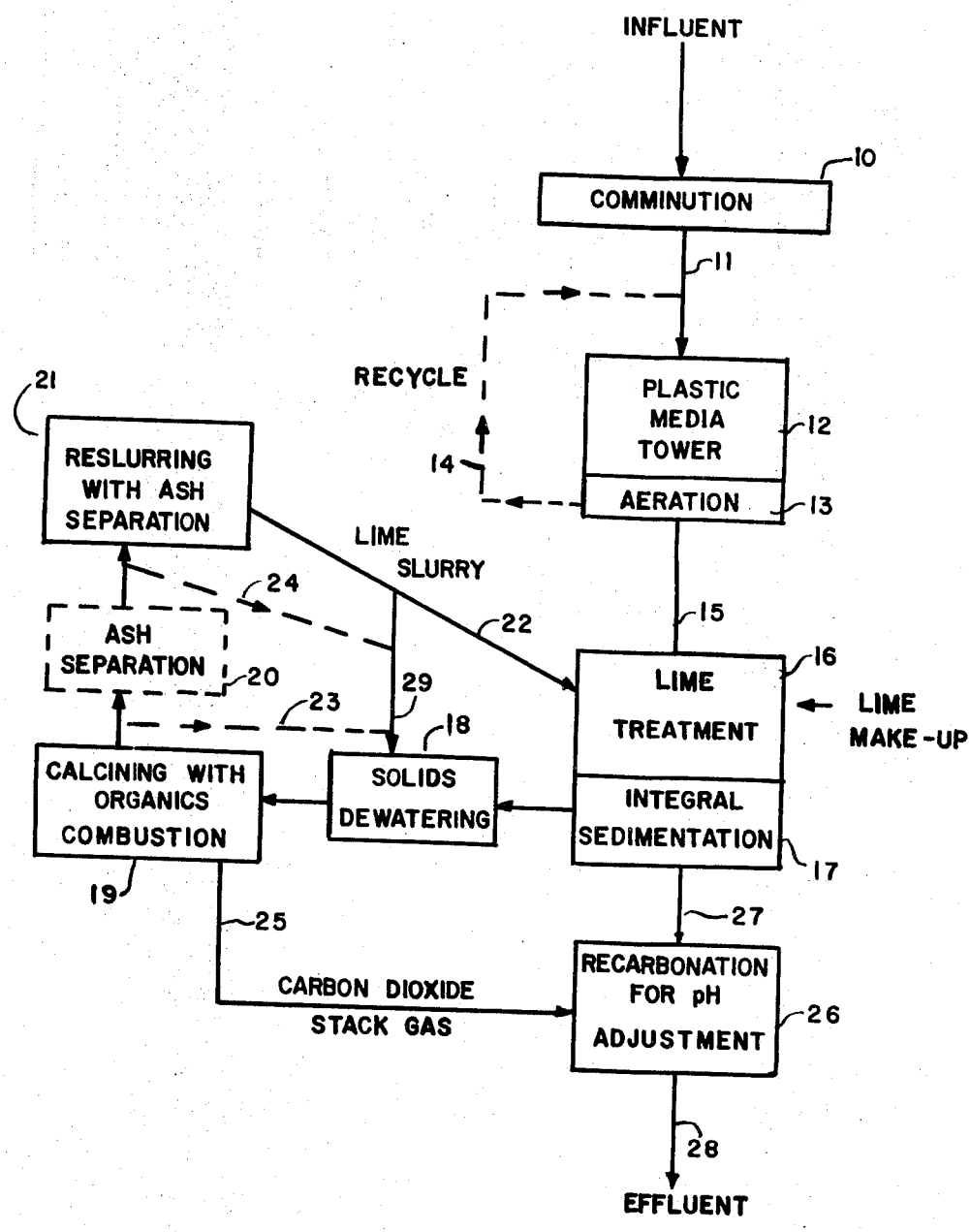

ABSTRACT OF THE DISCLOSURE

A process for the treatment of waste waters, particularly waste waters of domestic origin. A variable volume of influent waste material is passed over a plastic packed trickling filter to remove the dissolved bio-degradable organic material. The treated stream is held in an aeration basin and a constant flow is taken therefrom to a lime treatment basin where inorganic salts such as phosphates are precipitated and where solid material is coagulated and settled. Solid material is removed and dewatered and then calcined to recover the lime therefrom. Ash from the organic constituents may then be removed and the lime recycled to the lime basin. Carbon dioxide from the calciner stack gas is used to adjust the pH of the effluent to optimum before release.

BACKGROUND OF THE INVENTION

Field of the invention

This invention relates to a process and an apparatus for treating waste streams, in particular domestic waste streams containing dissolved salts such as phosphates.

Description of the prior art

Prior waste treatment systems have usually been over-designed to compensate for diurnal variations in volume and in concentration. Sized for average or median flow, the systems invariably produce an effluent high in organic and chemical B.O.D. materials and dissolved inorganic solids during times when design capacity is exceeded. Another common problem in present waste treatment systems is the precipitation and disposal of dissolved salts such as phosphates commonly used as builders in detergents. Further problems exist in the settling, dewatering and disposal of organic solids from a waste treatment process. Almost invariably the removal and disposal of organic solids in a waste treatment process is accompanied by putresence of the solid organic materials.

Thus, there is a need for a process and apparatus for waste treatment which can in one continuous process (1) reduce the B.O.D. from dissolved organics, (2) precipitate dissolved salts such as phosphates, (3) prevent odor and handling problems in disposal of organic sludge, and (4) provide for pH adjustment of the effluent stream.

SUMMARY OF THE INVENTION

It is an object of the present invention to provide a process and apparatus for waste treatment which will reduce organic and chemical B.O.D. and effectively dispose of solids.

It is a further object of the present invention to provide a process and apparatus for sewage treatment which effectively removes dissolved phosphate materials from the waste stream.

It is also an object of the present invention to provide a process and apparatus for waste treatment which utilizes recycling of the chemical treatment materials used therein.

It is still another object of the present invention to provide a process and apparatus for waste treatment which provides a soft, phosphate free, low B.O.D. and nitrogen, disinfected, effluent.

Broadly the process of the present invention for treating a waste stream may be carried out by the combination of steps which includes reducing the quantity of bio-degradable organic material in the waste stream. The inorganic material present is then precipitated and solid material present is coagulated and settled by adding a chemical agent to the stream. The precipitated and settled materials are then removed from the stream. The chemical settling agent is recovered and then recycled for reuse in the precipitation and coagulation step.

More specifically the process of the present invention may be carried out by any combination of steps which include comminuting the solid material in the waste stream and then passing the comminuted stream through a trickling filter packed with a plastic media. The stream is then received in a catch basin and aerated. The stream after aeration is removed at a constant flow rate and forwarded to a treating basin where the stream is treated with lime to precipitate some dissolved inorganic material and to coagulate and settle the suspended solid material in the stream. The precipitated and settled materials are then removed, dewatered, and calcined to regenerate the lime and to decompose the organic material. The ash material from the decomposed organic material is then separated from the lime. A portion of the regenerated lime is then recycled to the lime treatment basin as needed. Stack gases produced from decomposition of the organic material and regeneration of the lime is used to adjust the pH of the final effluent to the neutral state.

The apparatus aspects of the present invention may be carried out by using a combination including means for reducing the quantity of dissolved and bio-degradable organic material in the waste stream. Means are provided for the addition of a chemical agent for precipitating dissolved inorganic material, coagulating and settling the suspended solid material in the stream. Means for removing the precipitated and settled material from the stream is provided. Further means for recovering the chemical agent is also provided. Finally, a means for recycling the chemical agent for reuse in the precipitation and coagulation step is provided.

BRIEF DESCRIPTION OF THE DRAWING

The drawing is a schematic flow diagram of the process and apparatus for carrying out the present invention.

DESCRIPTION OF THE PREFERRED EMBODIMENTS

Referring now to the drawing the influent waste stream may be derived from industrial waste or more preferably may be a domestic waste stream such as common municipal sewage. The present process and apparatus are ideally suited for the effective treatment of municipal sewage. The influent is first received in a comminutator 10 where the solids are reduced in size to provide efficient flow through the remainder of the waste treatment system. The comminutator may be any of many commercially available types sized to adequately handle the influent stream. The comminutator 10 as shown in the drawing may include a holding basin or reservoir (not shown) either before or after the comminution step. The waste stream then flows through line 11 into the top of a chamber or vessel 12 which contains a biological trickling filter. The trickling filter is preferably one made from a plastic media having a biological growth thereon which effectively destroys dissolved B.O.D. materials in the influent stream. A number of satisfactory, commercially available plastic filter media can be used in this vessel, e.g., "Flocor," a plastic material produced and marketed by Ethyl Corporation. However, other materials may be used to provide the bacteriological treatment and the invention is not necessarily limited to the use of a plastic material. However, because of the particular effectiveness of this material it is preferred in the present apparatus and process. The plastic material offers an ideal surface for growth of biologically active material and provides for the uniform spread of liquid to all surface areas of the plastic packing media. Large void spaces provide a high flow of air to perpetuate the growth of the biological material and to allow free fall passageways for solid materials to be carried through the filter media.

After the influent stream has passed through the plastic filled biological treatment vessel 12 the treated fluid is collected in a basin 13 underneath the plastic media and may, if desired, be aerated in this vessel. However, aeration may be carried out in a separate vessel and appropriate flow lines connecting this vessel (not shown) will be provided. The basin 13 may be a plurality of basins or storage areas wherein the product from the biological treater can be stored prior to or after being aerated. At times of heavy dissolved organic B.O.D. loading it may be desirable to recycle material through line 14 from the aeration basin back through the vessel containing the plastic media 12. This will provide secondary treatment for the aerated material when the organic content is higher than normal.

The material, having little or no B.O.D. from dissolved organic material, then flows through the line 15 into the lime treatment vessel or basin 16. An important part of the invention is involved in controlling the flow of treated effluent from the aeration or storage basin 13 to the lime treatment vessel. Suitable flow control devices such as weirs (not shown) or a suitable control valve or valves (not shown) are provided to insure a constant flow of B.O.D. treated effluent from the aeration vessel to the lime treatment vessel 16 whereby diurnal variations in flow will not upset or place increased loads on the remainder of the waste treatment system.

In the lime treatment vessel 16 large quantities of lime slurry are added by appropriate distributing means and thoroughly mixed with the incoming effluent either by suitable mixing valves or premixing chambers and the mixed fluid stream is then fed into the large lime treatment and settling vessel 16. The lime will precipitate inorganic salts contained in the waste stream such as magnesium, calcium, and particularly the phosphate materials normally present in high concentration in municipal sewage. Additionally, the lime will coagulate and settle the suspended solid materials such as the organic material normally present in a municipal influent. A suitable solids sedimentation and removal section 17 is provided in the bottom of the lime treatment vessel. Suitable settlement and solids removal systems are commercially available and need not be described in detail here. It is sufficient to say that the sedimentation section 17 will provide for continuous or periodic removal of the settled solids material from the lime treatment vessel through suitable conveying mechanisms to the solids dewatering station 18. The solids dewatering station provides mechanical devices for separating as much liquid as possible from the sludge and solids removed from the lime treatment vessel. Suitable conventional sludge dewatering devices are well known and are commercially available. After substantial quantities of water are removed from the solid material, the solid material is then forwarded to the calcining furnace 19. The calcining furnace may be a rotary kiln or other suitable device for raising the solids to sufficiently high temperature to burn away substantially all of the organic material contained therein. Additionally, the furnace or kiln should be operated at a sufficiently high temperature to produce the maximum amount of regenerated calcium oxide as possible. After calcining the solid material is moved by a suitable solids conveyor (not shown) to an ash separation station 20. The ash separation station may utilize conventional solids separators based on gravity or centrifugal forces to separate the calcium oxide from the ash. The regenerated calcium oxide is conveyed on to a reslurrying vessel 21 where the regenerated lime is mixed with water to the proper consistency. If desired the ash separation station may be omitted and a portion of the calcined product disposed of to provide a continual bleed to avoid build up of the inorganic ash in the recycled lime. This will, of course, necessitate replacement of lime with fresh makeup lime when inorganic ash materials build up to detrimental levels in the recycle lime slurry.

Line 22 connects the reslurrying vessel 21 with the lime treatment vessel 16 and is provided with appropriate flow control devices (not shown) to continuously meter makeup lime to the lime treatment vessel 16. During times of high mineral content of the influent it will be necessary to bleed the system of some lime. Innerconnection line 23 is provided to return the calcined lime to the solids dewatering station 18 where they will be combined with solids from the sedimentation vessel 17 for subsequently calcining and disposal of a portion thereof. A recycle line 23 may be provided from the kiln or furnace 19 to return the material to the solids dewatering station 18. This recycle line will be used in order to achieve the proper dryness of material to insure adequate ash separation and appropriate quality of regenerated lime for slurrying and return to the lime treatment vessel. Additionally, a recycle line 24 may be provided to the solids dewatering station 18 for appropriate startup and purging procedures in connection with the ash separator.

Line 25 connects the stack of the kiln or calcining device 19 to a vessel 26 which is utilized for adjusting the pH of the effluent by treating the influent material in this vessel with carbon dioxide contained in the stack gas. Line 27 takes the clear fluid from the last stage of the sedimentation section of the lime treatment vessel 16 and feeds it to vessel 26 for pH adjustment. After treatment with the appropriate amount of carbon dioxide the effluent is released through line 28 to the disposal stream.

As can be seen from the foregoing description the present process and apparatus provides treatment of incoming influent material for removal of B.O.D. dissolved material whereby an effluent low in B.O.D. materials is created. Additionally, the present system provides a controlled flow from the biological treatment-aeration section to the lime treatment section. This is a critical feature of the present invention and is believed to be one of the novel aspects thereof. By adequately sizing all the facilities downstream from the aeration or storage vessel 13 to treat the average flow from a municipality or sewage producing environment one can minimize investment in the equipment and vessels and also insure that no effluent will be generated which contains undesirable quantities of objectionable materials. The use of massive treatments for lime for municipal sewage has been explored heretofore but has been considered uneconomical because of the large expense for unrecovered lime. No waste treatment systems are believed to have been proposed heretofore which incorporates the regeneration of large quantities of lime such as used in the present process. By utilizing the constant rate of input to the lime treatment section maximum effectiveness of sedimentation is achieved. Any dissolved calcium or magnesium materials in the waste stream are precipitated and the magnesium hydroxide produced assists the lime in acting as a coagulant and settling the suspended solid materials. Since substantially all of the lime may be recovered in the present process, the chemical dosage of lime is not a critical parameter and the lime may be used freely in supplying a constant feed to a mixing basin to maintain an established precipitant and coagulant level in the lime treatment vessel at all times. By combining the settled solids with large quantities of lime the putresence of the organic material is minimized. The rapid handling through the solids dewatering and calcining stations in a continuous uninterrupted process prevents any significant amount of anaerobic decomposition from occurring.

In order to remove the precipitated magnesium and phosphate salts it will, of course, occasionally be necessary to bleed or purge the recycle lime system to remove quantities of these materials to achieve a suitable level. This will be no problem to achieve once the system is set in operation. Thus in normal operation the present sewage treatment process will utilize only one charge of lime and thereafter it should maintain the lime supply by regeneration, except for added makeup necessary caused by purging of some of the lime to decrease the calcium, magnesium, and phosphate content of the recycle lime slurry.

The present sewage treatment process and apparatus also provides a novel supply and facility for the recarbonation of the effluent from the sedimentation vessel to adjust the pH of this material to the most desirable level to provide an effluent compatible with marine and organic life. The present system will effectively remove a substantial quantity of the nitrogen materials normally present in effluent streams from municipal sewage treatment plants which cause problems in marine and aquatic life in streams receiving the effluent. It is well known that most of the nitrogen in domestic waste waters is in the form of solid material and becomes a problem only when the solids are biologically degraded. The present system avoids the degradation of suspended organics and further accomplishes removal of dissolved nitrogen during biological conversion of the dissolved material in the plastic filter media area. Lime is known to be an adequate disinfectant and has been used for phosphate removal, however, the quantity of lime used has been small because no facility for recovery of the lime was provided. Another feature of the present process is that the massive use of lime in the lime treatment stage will reduce the carry over of biological life normally attendant in using a plastic trickling filter for organic removal. If properly treated in the trickling filter section the stream as it is received in the lime makeup basin will be substantially free of dissolved B.O.D. materials and thus the treatment with lime will further sterilize the material to provide an effluent which is suitable for reuse in a number of processes.

Thus, it is seen that the foregoing apparatus and process provides an efficient method of treatment of waste materials whereby the effluent will be disinfected, soft, essentially free from suspended solids, and low in biological oxygen demand materials, phosphorous, and nitrogen. The only material requiring disposal is a quantity of ash which will be mixed with lime, calcium phosphate, and magnesium hydroxide. This material is an excellent soil additive and may be used for this purpose.

The foregoing disclosure and description of the process and apparatus of the present invention is illustrative and exemplary thereof. In light thereof, modifications will be apparent to those skilled in the art. Therefore, the present invention is to be limited only by the scope of the appended claims.

What is claimed is:
1. In a process for treating a waste stream the combination comprising:
   (a) comminuting the solid material in said waste stream;
   (b) passing said comminuted stream through a trickling filter packed with plastic media;
   (c) receiving said stream in a catch basin and aerating said stream;
   (d) removing said stream after aeration at a constant flow rate;
   (e) treating said stream with lime to precipitate dissolved inorganic material and to coagulate and settle suspended solid material in said stream;
   (f) removing said precipitated and settled materials;
   (g) dewatering said removed materials;
   (h) calcining said dewatered materials to regenerate said lime and to decompose the organic material present;
   (i) separating the ash material from said regenerated lime;
   (j) recycling a portion of said regenerated lime to the operation defined in step (e); and
   (k) mixing the stack gases from step (h) with the liquid obtained from step (e) to adjust the pH of the liquid to an optimum state.

2. In the process of claim 1 wherein there is included the step of recycling a portion of said regenerated lime for use in dewatering step (g).

3. In an apparatus for treating a waste stream the combination comprising:
   (a) a comminutator for comminuting the solid material in said waste stream;
   (b) a trickling filter packed with plastic media for treating said comminuted stream;
   (c) a catch basin for receiving said treated stream, including means for aerating said stream;
   (d) means for removing said stream after aeration at a constant flow rate;
   (e) means for treating said stream with lime to precipitate dissolved inorganic material and to coagulate and settle suspended solid material in said stream;
   (f) means for removing said precipitated and settled materials;
   (g) means for dewatering said removed materials;
   (h) means for calcining said dewatered materials to regenerate said lime and to decompose the organic material present;
   (i) means for separating the ash material from said regenerated lime;
   (j) means for recycling a portion of said regenerated lime to the apparatus defined in subparagraph (e); and
   (k) means for mixing the stack gases from the apparatus of subparagraph (h) with the liquid obtained from the apparatus defined in subparagraph (e) and to adjust the pH of the liquid to an optimum state.

4. In the apparatus of claim 3 wherein apparatus is included for recycling a portion of said regenerated lime for use in the dewatering means of subparagraph (g).

5. In the apparatus of claim 3 wherein there is provided means for recycling a portion of the stream from said catch basin back to the feed stream to said trickling filter.

References Cited

UNITED STATES PATENTS

| 2,072,154 | 3/1937 | Butterfield | 210—45 |
| 3,269,542 | 8/1966 | Renzi et al. | 210—17 X |
| 3,403,095 | 9/1968 | Chipperfield et al. | 210—17 |
| 2,065,123 | 12/1936 | Downes | 210—18 X |

MICHAEL E. ROGERS, Primary Examiner

U.S. Cl. X.R.

210—8, 17, 18, 45, 152, 195